US011247541B2

(12) United States Patent
Asano et al.

(10) Patent No.: US 11,247,541 B2
(45) Date of Patent: Feb. 15, 2022

(54) SUNROOF DEVICE

(71) Applicant: AISIN CORPORATION, Kariya (JP)

(72) Inventors: Taiki Asano, Kariya (JP); Shota Motomura, Kariya (JP); Katsura Inoue, Kariya (JP); Katsutoshi Kato, Kariya (JP)

(73) Assignee: Aisin Corporation, Kariya (JP)

( * ) Notice: Subject to any disclaimer, the term of this patent is extended or adjusted under 35 U.S.C. 154(b) by 0 days.

(21) Appl. No.: 17/090,211

(22) Filed: Nov. 5, 2020

(65) Prior Publication Data

US 2021/0178870 A1 Jun. 17, 2021

(30) Foreign Application Priority Data

Dec. 16, 2019 (JP) .............................. JP2019-226258

(51) Int. Cl.
*B60J 7/043* (2006.01)
*B60J 7/057* (2006.01)

(52) U.S. Cl.
CPC .............. *B60J 7/043* (2013.01); *B60J 7/0573* (2013.01)

(58) Field of Classification Search
CPC ..... B60J 7/02; B60J 7/024; B60J 7/043; B60J 7/0435; B60J 7/047; B60J 7/05; B60J 7/053; B60J 7/057; B60J 7/0573; E05F 7/04; E05Y 2800/422; E05D 11/10

USPC ........... 296/216.02, 216.03, 216.04, 216.05, 296/216.08, 221, 222, 223; 16/DIG. 6, 16/DIG. 33

See application file for complete search history.

(56) References Cited

U.S. PATENT DOCUMENTS 8,562,071 B2 10/2013 Hirata et al.
9,272,607 B2 3/2016 Kokubo et al.

FOREIGN PATENT DOCUMENTS

JP 2013-23057 A 2/2013
JP 6090598 B2 2/2017

*Primary Examiner* — Dennis H Pedder
*Assistant Examiner* — Joyce Eileen Hill
(74) *Attorney, Agent, or Firm* — Finnegan, Henderson, Farabow, Garrett & Dunner, LLP

(57) ABSTRACT

A front shoe as a sliding member includes a pair of support walls facing each other in a vehicle width direction, and a fulcrum shaft disposed in a bridging manner between both support walls. A support bracket as a support member supporting a movable panel and integrally moving while being joined to the front shoe includes a joint block having an engagement portion for the fulcrum shaft and serving as a second joint portion joined to a first joint portion on the front shoe side. Further, the joint block is arranged between both support walls while being relatively rotatable about the fulcrum shaft. On the joint block, a cushion member interposed between the joint block and the support walls while being fixed thereto is disposed.

6 Claims, 9 Drawing Sheets

SUNROOF DEVICE

CROSS REFERENCE TO RELATED APPLICATIONS

This application is based on and claims priority under 35 U.S.C. § 119 to Japanese Patent Application 2019-226258, filed on Dec. 16, 2019, the entire content of which is incorporated herein by reference.

TECHNICAL FIELD

This disclosure generally relates to a sunroof device.

BACKGROUND DISCUSSION

Conventional sunroof devices for vehicles include a sunroof device that includes a movable panel disposed in a roof opening portion of a vehicle, sliding members that slide along guide rails extending in a vehicle longitudinal direction, and support members that support the movable panel and, in conjunction therewith, cause the movable panel to perform opening and closing movements by moving integrally with the sliding members while being joined to the sliding members.

For example, in a sunroof device described in JP2013-23057A (Reference 1), each sliding member has a pair of support walls that are arranged facing each other and a fulcrum shaft that is disposed in a bridging manner between both of the support walls. A support member has an engagement portion for engagement with the fulcrum shaft at a tip portion and is joined to the sliding member while being rotatable about the fulcrum shaft. Further, the support member has the tip portion, which includes the engagement portion, being arranged between both support walls of the sliding member. In the sunroof device, improvement in ease of assembly is attained by enabling position adjustment of the movable panel by use of gaps formed between the tip portion of the support member and the respective support walls of the sliding member because of the above-described configuration.

However, in the configuration of the above-described conventional technology, there is a possibility that the support member and the sliding member being relatively displaced along the fulcrum shaft, which constitutes a rotational joint point therebetween, due to vibration or the like of the vehicle cause the tip portion of the support member to interfere with the respective support walls of the sliding member. There is a possibility that occurrence of contact noise due to the interference causes quality feeling of the sunroof device to deteriorate.

Thus, for example, in a sunroof device described in JP6090598B (Reference 2), a position adjustment mechanism of a movable panel is disposed on each support member of the sunroof device. The sunroof device is configured to be capable of suppressing interference between the support member and a sliding member by eliminating backlash between the support member and the sliding member by use of the position adjustment mechanism, and thereby securing high quality feeling.

However, adding such a position adjustment mechanism to the support member causes the configuration of the support member to become complex. Since there is a problem that this complexity causes production cost to increase and, at the same time, ease of assembly to deteriorate, room for improvement has been left in terms of this point.

A need thus exists for a sunroof device which is not susceptible to the drawback mentioned above.

SUMMARY

A sunroof device includes a movable panel disposed in a roof opening portion of a vehicle, a guide rail extending in a vehicle longitudinal direction, a sliding member sliding along an extending direction of the guide rail, and a support member supporting the movable panel and causing the movable panel to perform opening and closing movements by moving integrally with the sliding member while being joined to the sliding member. The sunroof device also includes a first joint portion disposed to one of the sliding member and the support member and a second joint portion disposed to another of the sliding member and the support member. The first joint portion includes a pair of support walls facing each other in a vehicle width direction and a fulcrum shaft disposed in a bridging manner between both of the support walls. The second joint portion is a component having an engagement portion for engagement with the fulcrum shaft and being arranged between both of the support walls while being relatively rotatable about the fulcrum shaft by being joined to the first joint portion, and on the second joint portion, a cushion member to be interposed between the second joint portion and the respective support walls while being fixed to the second joint portion is disposed.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment of a sunroof device disclosed here will be explained with reference to the attached drawings.

Figure 1:
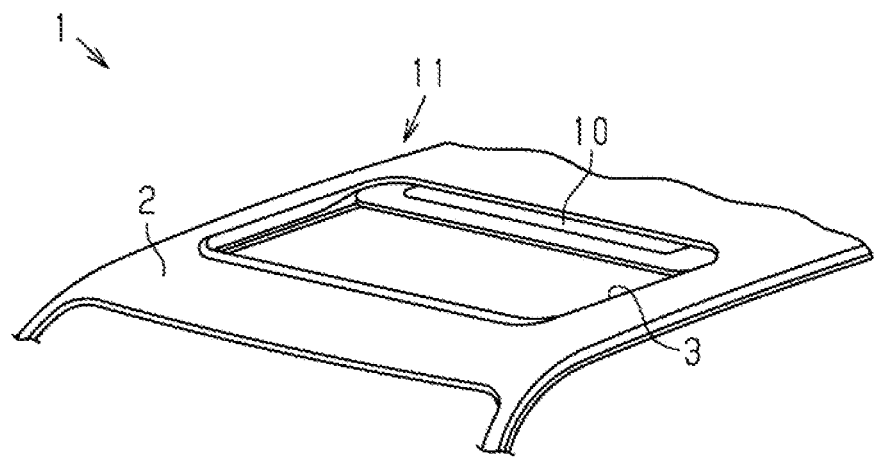
FIG. 1 is a perspective view of a vehicle provided with a sunroof device.
Figure 2:
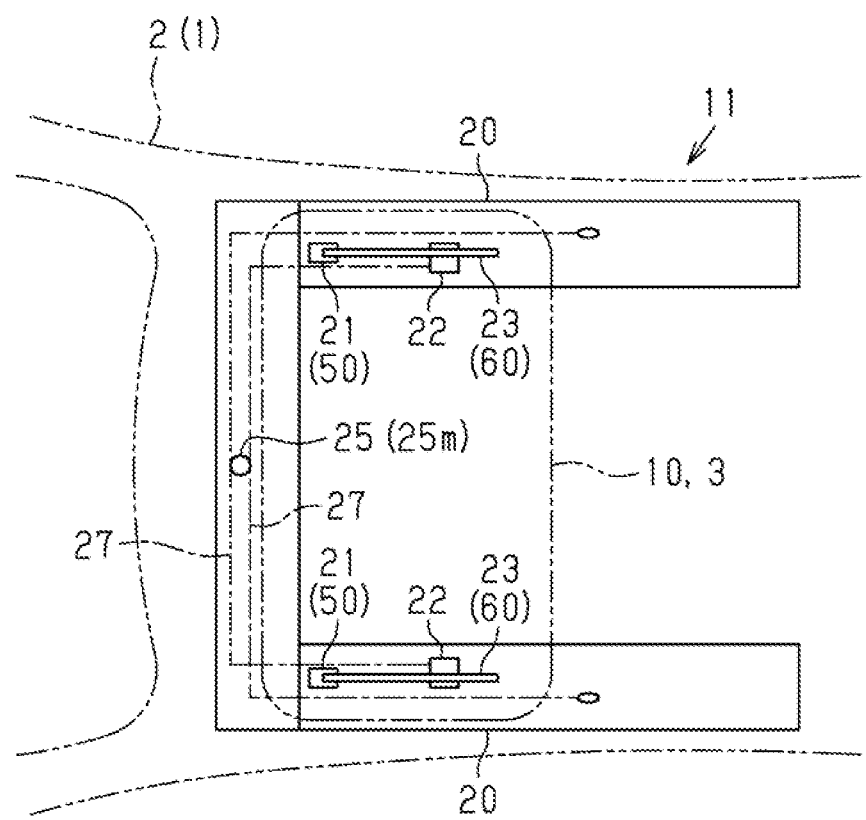
FIG. 2 is a schematic configuration diagram of the sunroof device.

As illustrated in FIGS. 1 and 2, in a roof opening portion 3 formed on a roof panel 2 of a vehicle 1, a movable panel 10 that is capable of opening and closing the roof opening portion 3 and is formed in a substantially flat plate shape is disposed. The vehicle 1 of this embodiment is provided with a sunroof device 11 that causes the movable panel 10 to perform opening and closing movements by means of motor drive.

Specifically, as illustrated in FIG. 2, the sunroof device 11 of this embodiment includes a right-and-left pair of guide rails 20 and 20 that extend in the vehicle longitudinal direction at both edge sides in the width direction of the roof opening portion 3. The sunroof device 11 also includes a right-and-left pair of front shoes 21 and 21 and a right-and-left pair of rear shoes 22 and 22 that slide along the extending direction of the guide rails 20 and 20 while engaging with the respective guide rails 20 and 20. The sunroof device 11 of this embodiment includes a right-and-left pair of support brackets 23 that support the movable panel 10 on top thereof while being joined to the respective front shoes 21 and 21 and the respective rear shoes 22 and 22.

The sunroof device 11 of this embodiment includes an actuator 25 using a motor 25m as a driving source. In the sunroof device 11 of this embodiment, the actuator 25 is fixed to the roof panel 2 at a vehicle front-side position in the roof opening portion 3. Further, the sunroof device 11 of this embodiment includes a right-and-left pair of drive cables 27 and 27 that are wired along the right and left guide rails 20 and 20, respectively. Further, the drive cables 27 and 27 are joined to the rear shoes 22 and 22, which engage with the right and left guide rails 20 and 20, respectively. The sunroof device 11 of this embodiment is configured such that the respective rear shoes 22 and 22 sliding in the vehicle longitudinal direction, based on driving force of the actuator 25, which is transmitted via the drive cables 27 and 27, causes the movable panel 10, which is supported on top of the support brackets 23 and 23, to perform tilt movements and slide movements.

Note that, in the sunroof device 11 of this embodiment, the support structure and driving mechanism of the movable panel 10 configured as described above have bilaterally symmetrical configurations. Therefore, in the respective drawings referred to in the following explanation, it is assumed that either the right side configuration or the left side configuration is illustrated.

Figure 3:
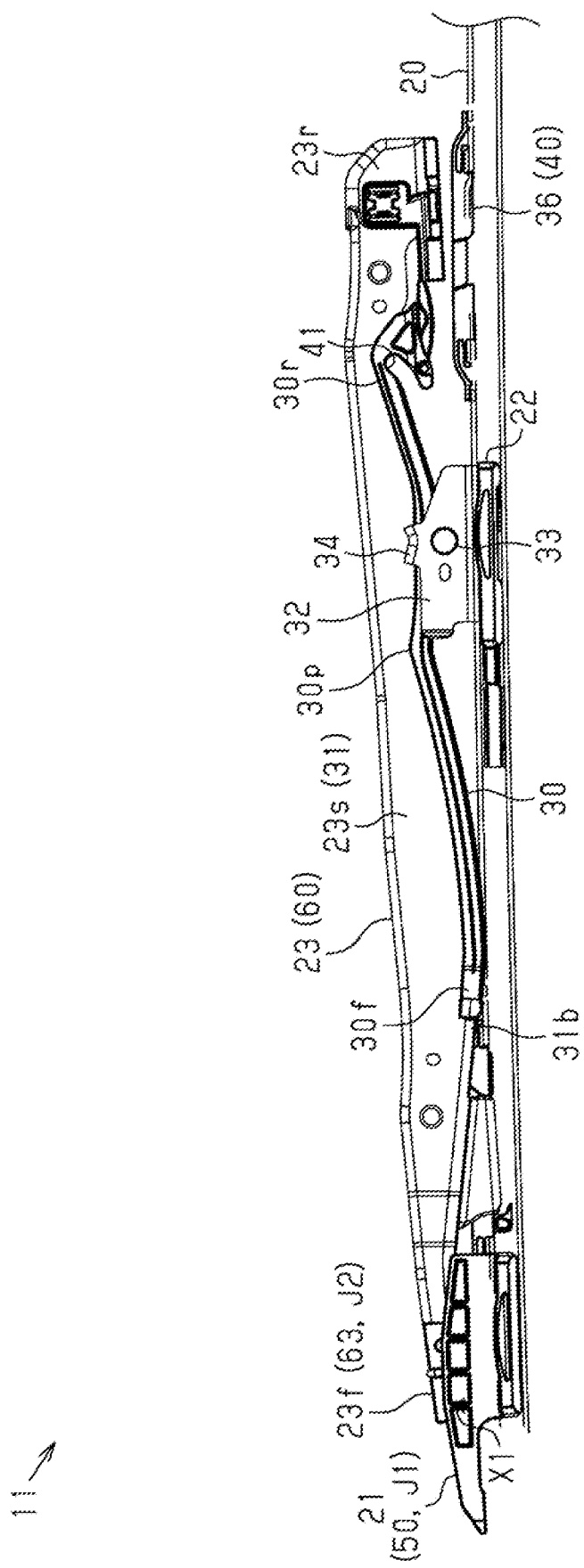
FIG. 3 is a side view of the sunroof device.
Figure 4:
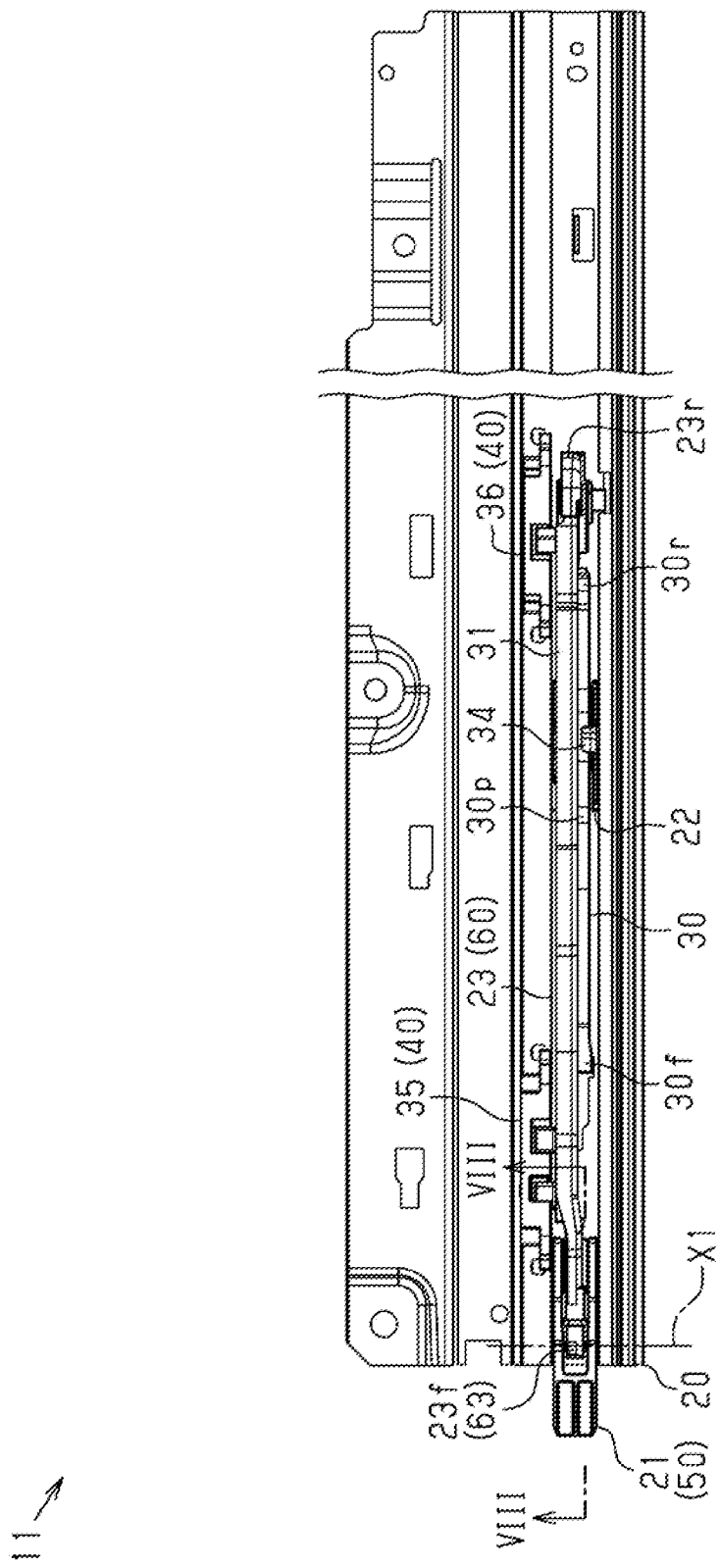
FIG. 4 is a plan view of the sunroof device.
Figure 5:
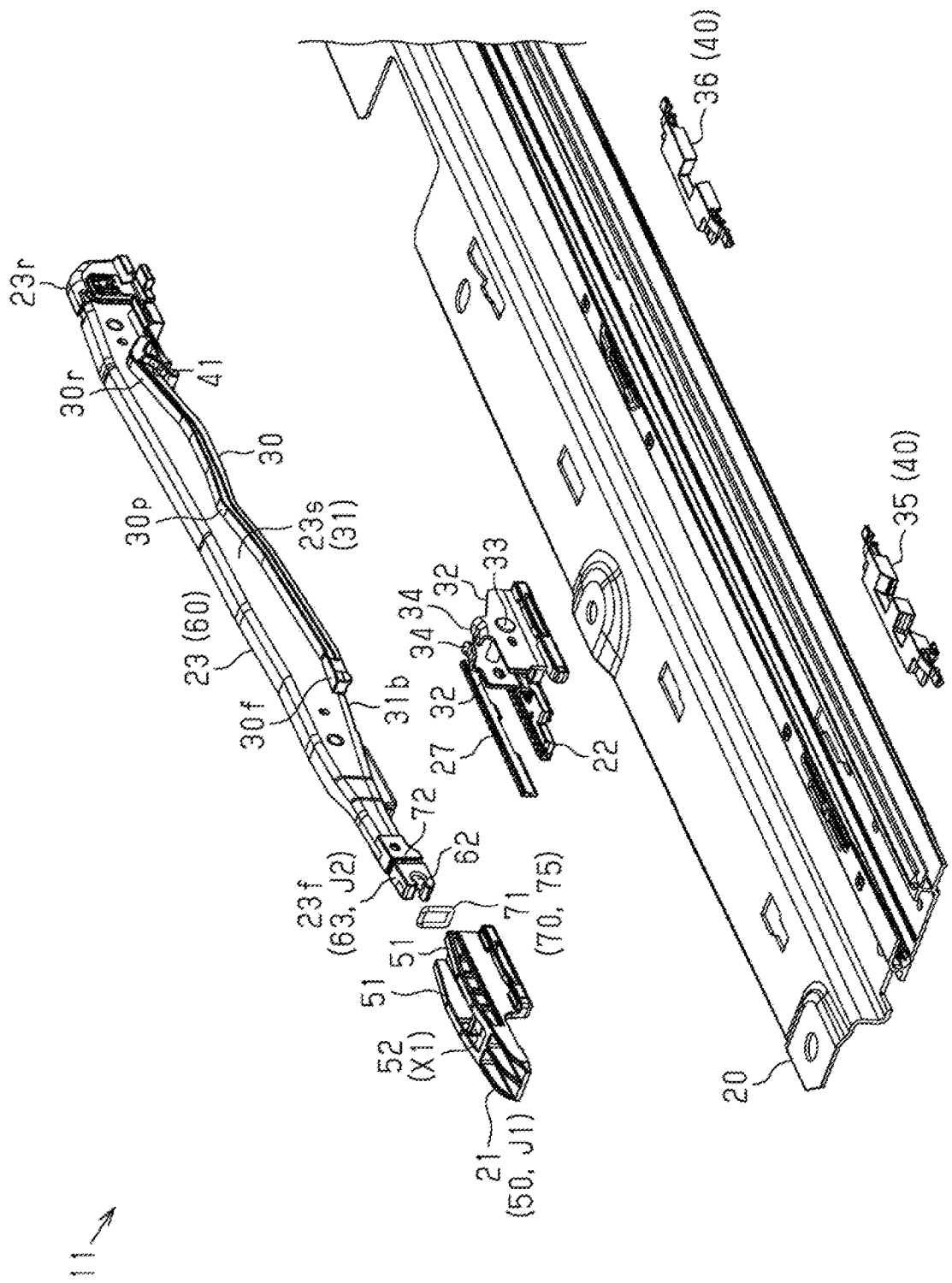
FIG. 5 is an exploded perspective view of the sunroof device.

When described in detail, in the sunroof device 11 of this embodiment, the support bracket 23 is formed in a long plate shape that extends in the vehicle longitudinal direction along the guide rail 20, as illustrated in FIGS. 3 to 5. The support bracket 23 has a front end portion 23f joined to the front shoe 21 in a rotatable manner. Further, the support bracket 23 has a guide flange 30 that extends in the longitudinal direction while projecting from side surfaces 23s thereof. The sunroof device 11 of this embodiment is configured such that the rear shoe 22, which is disposed in the rear of the front shoe 21, slidably engages with the guide flange 30, which is disposed on the support bracket 23.

When described in more detail, on the support bracket 23 of this embodiment, the guide flange 30 is fixed to a bottom edge portion 31b of a bracket body 31 that supports the movable panel 10 while projecting to both sides in the vehicle width direction. Note that the bracket body 31 of the support bracket 23 is formed by plastically working a metal plate. The guide flange 30 is formed integrally with the bracket body 31 by using a resin. The rear shoe 22 of this embodiment is joined to the support bracket 23 while sandwiching the guide flange 30 in both upward and downward directions.

Specifically, the rear shoe 22 of this embodiment includes a pair of vertical wall portions 32 and 32 that face each other in the width direction of the guide rail 20, that is, in the vehicle width direction, and a shaft-shaped member 33 that is disposed in a bridging manner between both vertical wall portions 32 and 32. Further, to top edge portions of the respective vertical wall portions 32 and 32, engagement claws 34 and 34 the tips of which are bent in the vehicle width direction in such a manner as to face each other are disposed, respectively. The rear shoe 22 of this embodiment is configured to engage with the guide flange 30 while the respective engagement claws 34 and 34 and the shaft-shaped member 33 sandwich the guide flange 30, which projects from the side surfaces 23s of the support bracket 23, in both upward and downward directions.

In the sunroof device 11 of this embodiment, the guide flange 30 on the support bracket 23 side is formed in an inclined flange shape that extends from the lower side to the upper side in the direction from the front end portion 23f side toward the rear end portion 23r side of the support bracket 23, that is, from the vehicle front side toward the vehicle rear side. Specifically, the guide flange 30 is formed in a ridge shape that has a peak portion 30p at a middle portion in the longitudinal direction and is downwardly inclined toward the vehicle front side when viewed from the side of the support bracket 23, that is, when viewed from the vehicle width direction (from the near side of the plane of paper in FIG. 3). Note that, in the sunroof device 11 of this embodiment, the rear shoe 22 is configured to engage with the guide flange 30 at a position on the rear side of the peak portion 30p of the guide flange 30 in the longitudinal direction when the movable panel 10 supported by the support bracket 23 is in a fully closed state. The sunroof device 11 of this embodiment is configured such that this configuration causes the movable panel 10, which is supported on top of the support bracket 23, to perform the tilt movements, based on movements of the rear shoe 22, which slides in the vehicle longitudinal direction along the guide rail 20.

Figure 6:
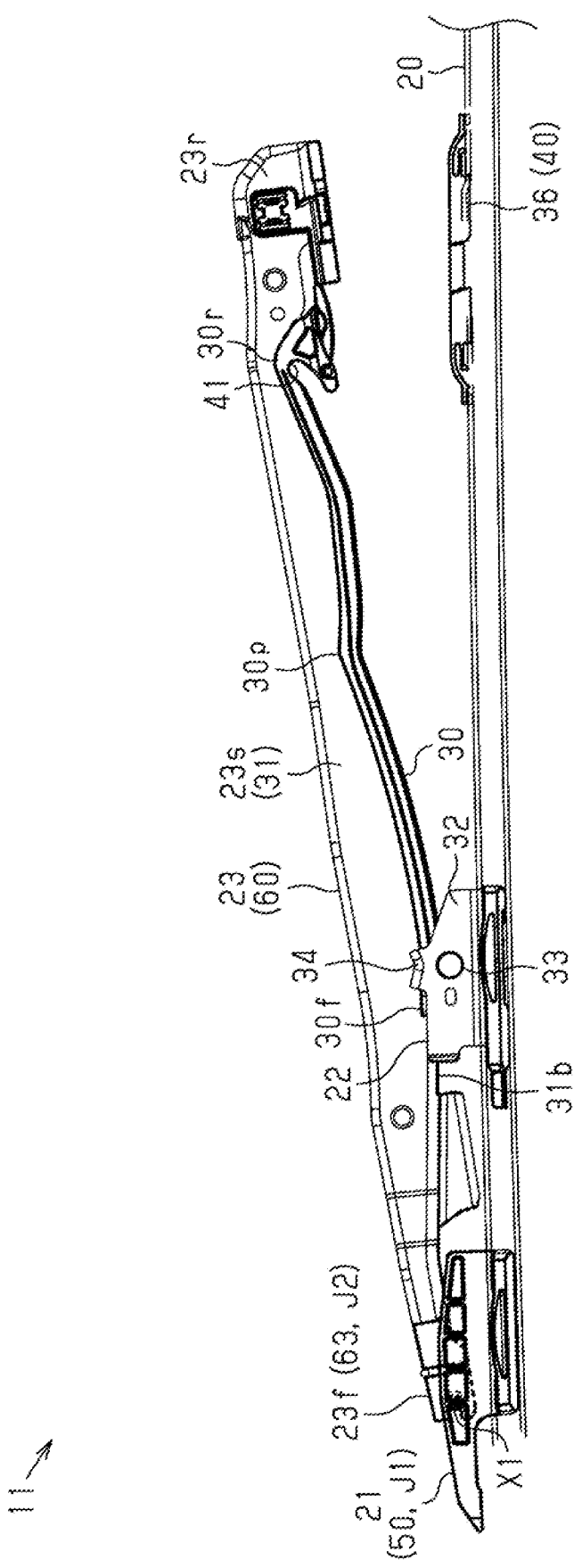
FIG. 6 is another side view of the sunroof device.

In other words, as illustrated in FIGS. 3 and 6, the rear shoe 22 sliding to the vehicle front side when the movable panel 10 is in the fully closed state causes the engagement position of the rear shoe 22 with the guide flange 30, which is disposed on the support bracket 23, to also move to the front end portion 30f side of the guide flange 30. This change in the engagement position causes the support bracket 23 to rotate about a rotational joint point X1 with the front shoe 21, which is disposed to the front end portion 23f of the support bracket 23, as a fulcrum in accordance with the "ridge shape that is downwardly inclined toward the vehicle front side when viewed from the side", which is set on the guide flange 30 as described above. The sunroof device 11 of this embodiment is configured such that the rear end portion 23r of the support bracket 23 being lifted upward because of this rotation causes the movable panel 10, which is supported on top of the support bracket 23, to perform a tilt opening movement.

Further, the rear shoe 22 sliding to the vehicle rear side when the movable panel 10 is in a tilt open state causes the engagement position of the rear shoe 22 with the guide flange 30, which is disposed on the support bracket 23, to also move to the rear end portion 30r side of the guide flange 30. The sunroof device 11 of this embodiment is configured such that the rear end portion 23r of the support bracket 23 being pulled downward in accordance with the above-described "ridge shape that is downwardly inclined toward the vehicle front side", which is set on the guide flange 30, because of this movement causes the movable panel 10, which is supported on top of the support bracket 23, to perform a tilt closing movement.

As illustrated in FIGS. 4 and 5, in the sunroof device 11 of this embodiment, guide blocks 35 and 36 that are fixed to the guide rail 20 form a checking mechanism 40. Further, at the time of the above-described tilt movements of the movable panel 10, sliding of the front shoe 21 is restricted by action of the checking mechanism 40. This configuration enables the sunroof device 11 of this embodiment to smoothly rotate the support bracket 23, on top of which the movable panel 10 is supported, based on the sliding of the rear shoe 22.

As illustrated in FIGS. 3 and 6, the support bracket 23 of this embodiment has an engagement groove 41 into which the shaft-shaped member 33 of the rear shoe 22 fits because of movement of the engagement position of the rear shoe 22 to the rear end portion 30r of the guide flange 30. Further, in the sunroof device 11 of this embodiment, the rear shoe 22 sliding to the vehicle rear side while the shaft-shaped member 33 of the support bracket 23 fits into the engagement groove 41 causes the front shoe 21, which is joined to the front end portion 23f of the support bracket 23, to also slide to the vehicle rear side. The sunroof device 11 of this embodiment is configured such that this sliding causes the movable panel 10, which is supported on top of the support bracket 23, to perform a slide opening movement.

Specifically, as illustrated in FIGS. 1 and 3, the sunroof device 11 of this embodiment is configured such that the rear shoe 22 sliding to the vehicle rear side when the movable panel 10 is in the fully closed state causes the movable panel 10, which is supported on top of the support bracket 23, to be pulled down into the roof opening portion 3 in accordance with the above-described "ridge shape that is downwardly inclined toward the vehicle front side", which is set on the guide flange 30. The sunroof device 11 of this embodiment has a so-called inner slide type configuration in which the movable panel 10, while being in this state, moves under the roof panel 2.

Further, in the sunroof device 11 of this embodiment, at the time of such a slide movement of the movable panel 10, rotation of the support bracket 23 in a direction in which the rear end portion 23r of the support bracket 23 is lifted upward (rotation in the counterclockwise direction in FIG. 3) is restricted by action of the guide rail 20 and the above-described checking mechanism 40. The sunroof device 11 of this embodiment is configured such that the front shoe 21 and the support bracket 23 sliding to the vehicle front side integrally with the rear shoe 22 because of this restriction causes the movable panel 10, which is supported on top of the support bracket 23, to perform a slide closing movement.

(Abnormal Noise Prevention Structure)

Next, an abnormal noise prevention structure in the sunroof device 11 of this embodiment will be explained.

Figure 7:
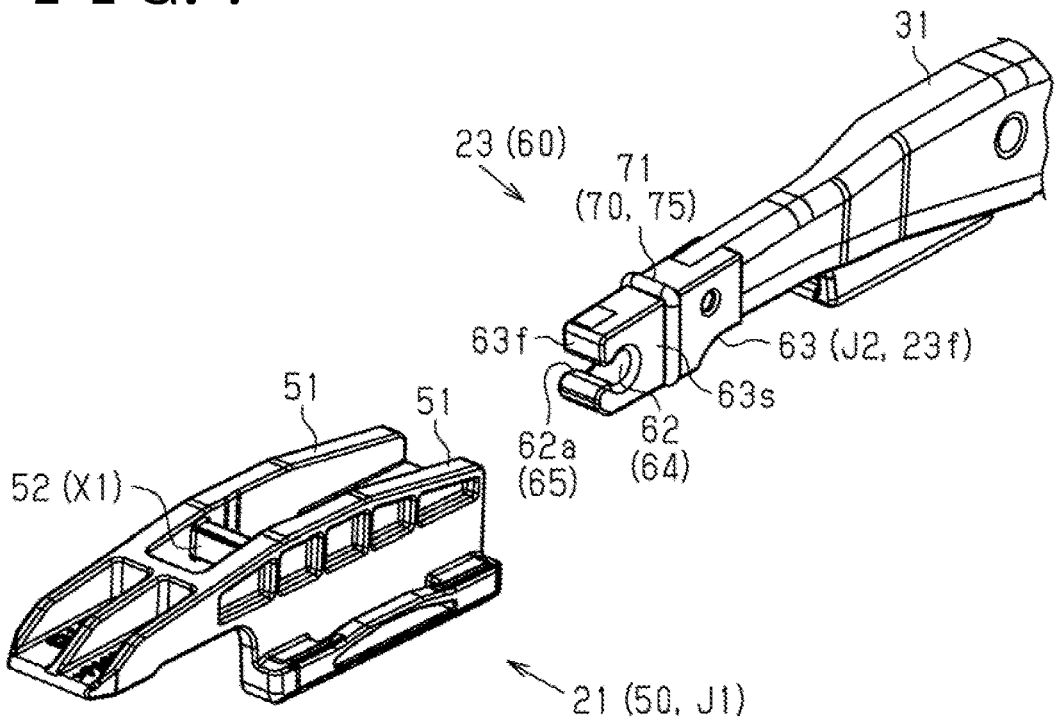
FIG. 7 is a perspective view of a front shoe and a joint block.
Figure 8:
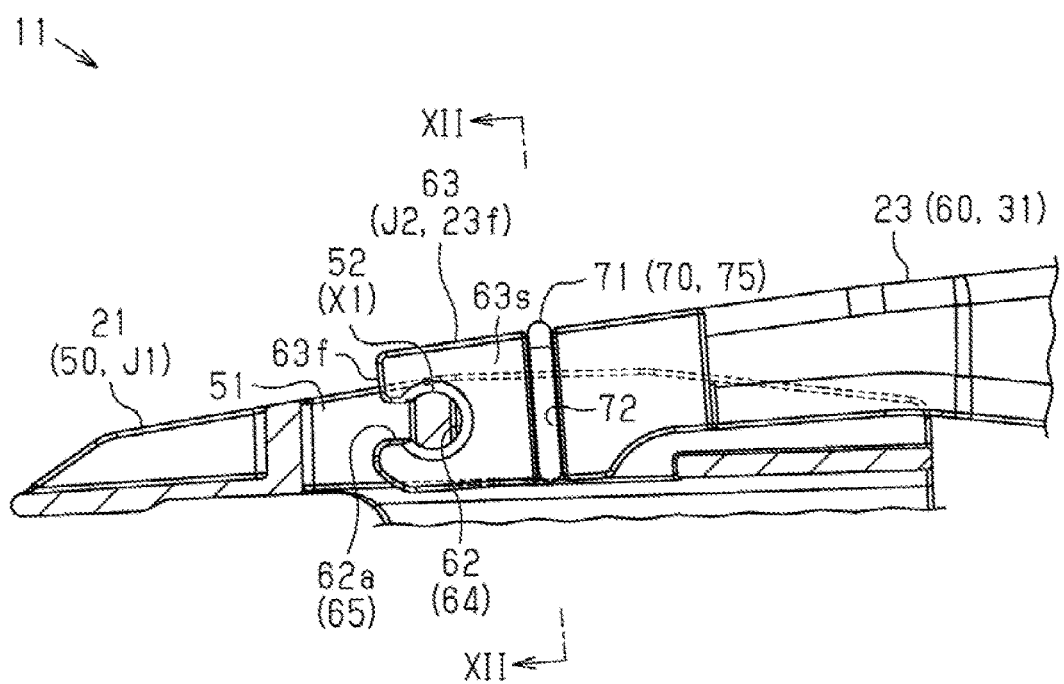
FIG. 8 is a cross-sectional view of the sunroof device.
Figure 9:
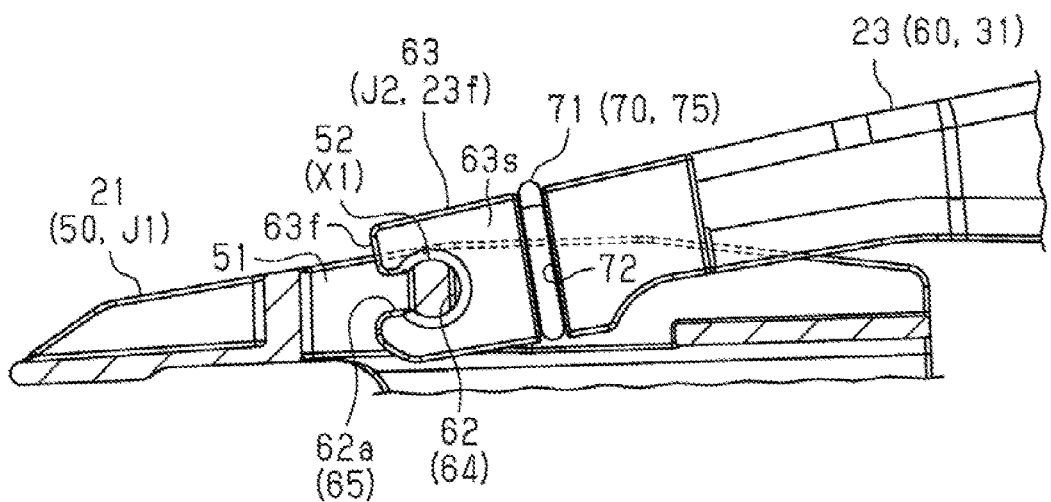
FIG. 9 is another cross-sectional view of the sunroof device.

As illustrated in FIGS. 7 to 9, in the sunroof device 11 of this embodiment, the front shoe 21, which constitutes sliding members 50 of the sunroof device 11, includes a pair of support walls 51 and 51 that face each other in the vehicle width direction and a fulcrum shaft 52 that is disposed in a bridging manner between both support walls 51 and 51. The support bracket 23, which constitutes support members 60, has an engagement portion 62 for engagement with the fulcrum shaft 52, which is disposed to the front shoe 21, at the front end portion 23f. The support bracket 23 of this embodiment is configured such that this configuration causes the front end portion 23f to be arranged between both support walls 51 and 51 of the front shoe 21 and, in conjunction therewith, to be joined to the front shoe 21 while being relatively rotatable about the fulcrum shaft 52.

In other words, in the sunroof device 11 of this embodiment, a first joint portion J1 that has the pair of support walls 51 and 51 and the fulcrum shaft 52 is disposed to the front shoe 21 side. In addition, a second joint portion J2 that has the engagement portion 62 for engagement with the fulcrum shaft 52 is disposed to the support bracket 23 side.

When described in detail, the support bracket 23 of this embodiment includes, at the front end portion 23f, a joint block 63 that is made of a resin and formed integrally with the bracket body 31. In the sunroof device 11 of this embodiment, the joint block 63 has an outer shape in the form of a flat substantially quadrangular prism. In addition, the joint block 63 has a holding hole 64 that penetrates the flat substantially quadrangular prism shape in the vehicle width direction (the direction orthogonal to the paper surface in FIGS. 8 and 9) and opens on both side surfaces 63s and 63s of the joint block 63 and a slit 65 that opens on a front end portion 63f of the joint block 63 in such a manner that the periphery of the holding hole 64 is partially cut off. On the support bracket 23 of this embodiment, the engagement portion 62 that axially supports the fulcrum shaft 52 having engaged with the holding hole 64 in a relatively rotatable manner is formed including the slit 65 as an opening portion 62a.

Figure 10:
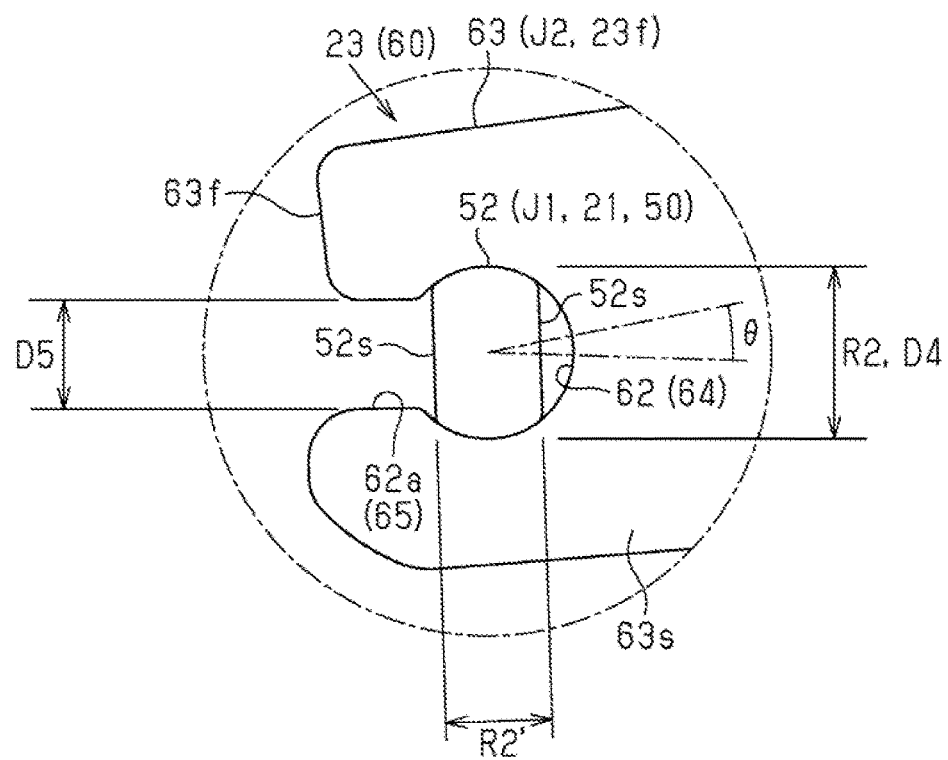
FIG. 10 is an enlarged view of a fulcrum shaft and an engagement portion.

Specifically, in the sunroof device 11 of this embodiment, the fulcrum shaft 52 on the front shoe 21 side has a cross-sectional shape in the form of a flat-sided oval that includes a pair of flat surfaces 52s and 52s facing in directions opposite to each other, as illustrated in FIG. 10. The fulcrum shaft 52 is supported between both support walls 51 and 51 while the flat surfaces 52s and 52s face in the vehicle longitudinal direction, respectively. Further, the holding hole 64 on the support bracket 23 side has an inner diameter D4 that is substantially equal to a diameter R2 of the fulcrum shaft 52 at a non-flat-sided portion of the flat-sided oval shape not including the flat surfaces 52s and 52s. The slit 65 has a groove width D5 that is substantially equal to a diameter R2' of the fulcrum shaft 52 at a flat-sided portion of the flat-sided oval shape including the flat surfaces 52s and 52s.

Figure 11:
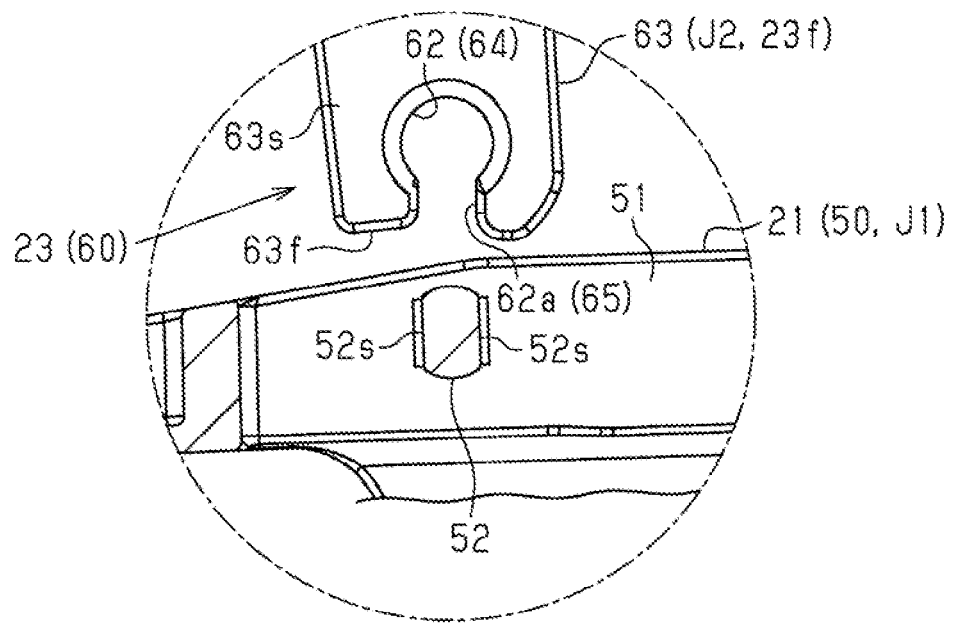
FIG. 11 is an explanatory diagram illustrating an assembly step of the front shoe and a support bracket.
Figure 12:
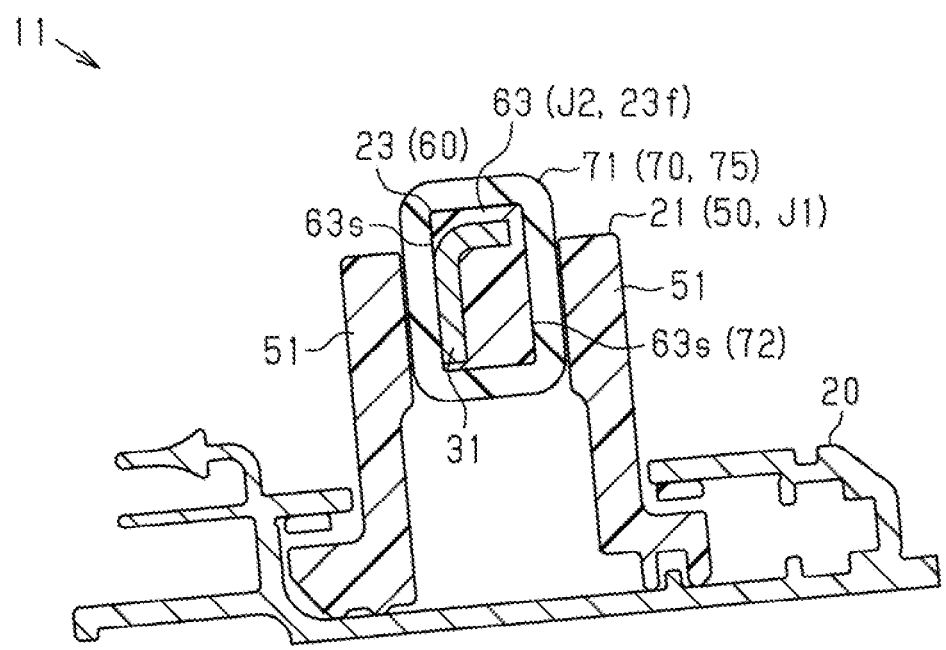
FIG. 12 is still another cross-sectional view of the sunroof device.
Figure 13:
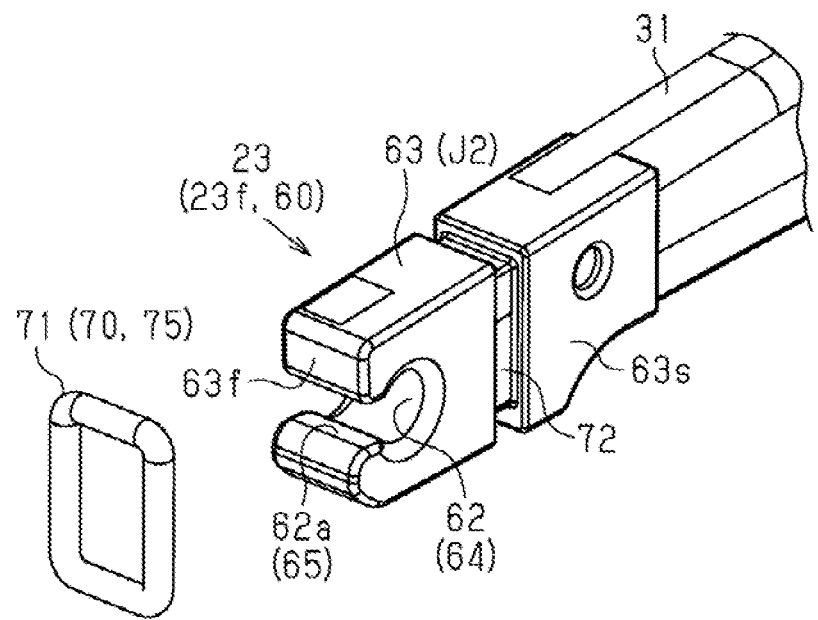
FIG. 13 is a perspective view of an O-ring and the joint block.

In other words, on the support bracket 23 of this embodiment, the slit 65 that opens at the front end portion 63f of the joint block 63, which is disposed at the front end portion 23f, constitutes the opening portion 62a of the engagement portion 62 through which the fulcrum shaft 52 on the front shoe 21 side can be engaged with and disengaged from the engagement portion 62 in a radial direction aligning with the slit 65 while the front end portion 23f faces the lower side substantially in the vertical direction, as illustrated in FIG. 11. Further, the support bracket 23 of this embodiment, by rotating (in the clockwise direction in FIG. 11) about the rotational joint point X1, which the fulcrum shaft 52 forms, as a fulcrum when being in this state, supports the movable panel 10 on top thereof while extending along the guide rail 20 (see FIGS. 8 and 9). The sunroof device 11 of this embodiment is configured such that this configuration causes engagement and disengagement of the fulcrum shaft 52 with the engagement portion 62 through the opening portion 62a to be restricted in a relative rotation range θ between the front shoe 21 and the support bracket 23 defined based on opening and closing movements of the movable panel 10.

As illustrated in FIGS. 7 to 9, 12, and 13, the sunroof device 11 of this embodiment includes an O-ring 71 that serves as an annular elastic member 70 that fits on the outer periphery of the joint block 63, which is disposed at the front end portion 23f of the support bracket 23. Specifically, the joint block 63 of this embodiment has an annular groove 72 that is formed in a recessed manner over the entire circumference of the joint block 63 on the outer periphery of the joint block 63 including both side surfaces 63s and 63s that face the support walls 51 and 51, respectively. In other words, in the sunroof device 11 of this embodiment, the O-ring 71, which is made of a rubber material, is fitted into the annular groove 72. The sunroof device 11 of this embodiment is configured such that this fitting causes the O-ring 71 to function as a cushion member 75 that is interposed between the support walls 51 and 51 on the front shoe 21 side, which constitute the first joint portion J1, and the joint block 63 on the support bracket 23 side, which constitutes the second joint portion J2.

Next, operation of this embodiment will be explained.

In the sunroof device 11 of this embodiment, even when the front shoe 21 and the support bracket 23 are relatively displaced along the fulcrum shaft 52, which constitutes the rotational joint point X1 therebetween, due to vibration or the like of the vehicle, the O-ring 71, which is fixed to the joint block 63 on the support bracket 23 side, comes into contact with the support walls 51 and 51 on the front shoe 21 side. Because of this configuration, using the O-ring 71 as the cushion member 75, impact due to interference between the joint block 63 and the respective support walls 51 and 51 is mitigated and, in conjunction therewith, occurrence of contact noise due to the interference is suppressed.

Next, advantageous effects of this embodiment will be explained.

(1) The sunroof device 11 includes the movable panel 10 that is disposed in the roof opening portion 3 of the vehicle 1 and the guide rails 20 that extend in the vehicle longitudinal direction. The sunroof device 11 also includes the front shoes 21 that serve as the sliding members 50 that slide along the extending direction of the guide rails 20 and the support brackets 23 that serve as the support members 60 that support the movable panel 10 and, in conjunction therewith, cause the movable panel 10 to perform opening and closing movements by moving integrally with the front shoes 21 while being joined to the front shoes 21. Each front shoe 21 includes the pair of support walls 51 and 51 that face each other in the vehicle width direction and the fulcrum shaft 52 that is disposed in a bridging manner between both support walls 51 and 51. Each support bracket 23 includes the joint block 63 that has the engagement portion 62 for engagement with the fulcrum shaft 52 and serves as the second joint portion J2 that is joined to the first joint portion J1 on the front shoe 21 side. Further, the joint block 63 is arranged between both support walls 51 and 51 while being relatively rotatable about the fulcrum shaft 52. On the joint block 63, the cushion member 75 that is interposed between the joint block 63 and the respective support walls 51 and 51 while being fixed to the joint block 63 is disposed.

The above-described configuration enables position adjustment of the movable panel 10, which is supported by the support brackets 23, to be performed with a simple configuration that uses gaps formed between the joint block 63 on the support bracket 23 side and the respective support walls 51 and 51 on the front shoe 21 side. In addition, action of the cushion member 75, which is interposed between the joint block 63 and the respective support walls 51 and 51, enables impact due to interference between the joint block 63 and the respective support walls 51 and 51 to be mitigated and occurrence of contact noise to be suppressed. In particular, fixing the cushion member 75 to the joint block 63 on the support bracket 23 side enables the cushion member 75 to be stably interposed between the joint block 63 on the support bracket 23 side and the respective support walls 51 and 51 on the front shoe 21 side, which relatively rotate about the fulcrum shaft 52, without increasing the size of the cushion member 75. As a consequence, this configuration enables high quality feeling to be secured.

(2) Each support bracket 23 includes the O-ring 71 that serves as the annular elastic member 70 that fits on the outer periphery of the joint block 63 including both side surfaces 63s and 63s, which face the support walls 51 and 51 on the front shoe 21 side, respectively. This configuration enables the cushion member 75 that is interposed between the joint block 63 and the respective support walls 51 and 51 while being fixed to the joint block 63 to be formed in a simple configuration and in an easily mountable manner.

(3) On the joint block 63, the annular groove 72 into which the O-ring 71 is fitted is disposed. This configuration enables the fitting position of the O-ring 71 with respect to the joint block 63 to be stably maintained with a simple configuration.

(4) The engagement portion 62 on the joint block 63 side has the opening portion 62a through which the fulcrum shaft 52 can be engaged and disengaged in a radial direction of the fulcrum shaft 52. Further, the fulcrum shaft 52 has a cross-sectional shape in the form of a flat-sided oval that includes the pair of flat surfaces 52s and 52s facing in directions opposite to each other. This configuration restricts the engagement and disengagement of the fulcrum shaft 52 through the opening portion 62a in a relative rotation range θ between the front shoe 21 and the support bracket 23 defined based on opening and closing movements of the movable panel 10 and, in conjunction therewith, allows the engagement and disengagement of the fulcrum shaft 52 through the opening portion 62a at a rotation position out of the relative rotation range θ defined based on opening and closing movements of the movable panel 10.

The above-described configuration enables stable opening and closing movements of the movable panel 10 involving relative rotation between the front shoe 21 and the support bracket 23 to be ensured and improvement in the ease of assembly to be achieved.

Note that the embodiment described above can be embodied by being modified as follows. The embodiment described above and the following modifications can be embodied by being combined with one another as long as they do not technically contradict one another.

In the above-described embodiment, it was configured such that the first joint portion J1 that has the pair of support walls 51 and 51 and the fulcrum shaft 52 is disposed to the front shoe 21 side and the second joint portion J2 that has the engagement portion 62 for engagement with the fulcrum shaft 52 is disposed to the support bracket 23 side. However, without being limited to the above, it may be configured such that the first joint portion J1 is disposed to the support bracket 23 side and the second joint portion J2 is disposed to the front shoe 21 side. In addition, the above-described configuration may be applied to a configuration in which the support members 60 are joined to the sliding members 50 other than the front shoes 21.

In the above-described embodiment, the annular groove 72 is formed in a recessed manner on the outer periphery of the joint block 63 that constitutes the second joint portion J2. It was configured such that fitting the O-ring 71 into the annular groove 72 causes the O-ring 71 to function as the cushion member 75 that is interposed between the joint block 63 and the respective support walls 51 and 51 on the first joint portion J1 side while being fixed to the joint block 63.

However, without being limited to the above, the annular groove 72 does not necessarily have to be disposed. In addition, an atypical annular elastic member 70, such as an X-ring and a C-ring, may be used. Further, an elastic member having a shape other than an annular shape may be used as the cushion member 75. It may also be configured such that the cushion member 75 is fixed through, for example, adhesion or the like.

Although, in the above-described embodiment, it was configured such that the fulcrum shaft 52 has a cross-sectional shape in the form of a flat-sided oval that includes the pair of flat surfaces 52s and 52s facing in directions opposite to each other, the cross-sectional shape may be changed to any shape. The shape of the engagement portion 62 may also be changed to any shape as long as engagement of the engagement portion 62 having the shape with the fulcrum shaft 52 enables the first joint portion J1 and the second joint portion J2 to be joined in a relatively rotatable manner.

In the above-described embodiment, it was configured such that the fulcrum shaft 52 can be engaged with and disengaged from the engagement portion 62 disposed on the joint block 63 in a radial direction of the fulcrum shaft 52 while the front end portion 23f of the support bracket 23 faces the lower side substantially in the vertical direction. However, without being limited to the above, as long as it is configured such that the engagement and disengagement of the fulcrum shaft 52 through the opening portion 62a are allowed at a rotation position out of a relative rotation range θ defined based on opening and closing movements of the movable panel 10, the relative rotation angle of the position allowing the engagement and disengagement may be set at any angle.

Next, technological concepts that can be understood from the embodiment and modifications described above will be described.

(a) The sunroof device is characterized in that the annular elastic member is an O-ring made of a rubber material. This configuration enables the cushion member that is interposed between the first joint portion and the respective support walls while being fixed to the first joint portion to be formed in a simple configuration and in an easily mountable manner.

(b) The sunroof device is characterized in that the fulcrum shaft has the cross-sectional shape in the form of a flat-sided oval that includes a pair of flat surfaces facing in directions opposite to each other. This configuration enables stable opening and closing movements of the movable panel involving relative rotation between the first joint portion and the second joint portion to be ensured and improvement in the ease of assembly to be simultaneously achieved.

A sunroof device includes a movable panel disposed in a roof opening portion of a vehicle, a guide rail extending in a vehicle longitudinal direction, a sliding member sliding along an extending direction of the guide rail, and a support member supporting the movable panel and causing the movable panel to perform opening and closing movements by moving integrally with the sliding member while being joined to the sliding member. The sunroof device also includes a first joint portion disposed to one of the sliding member and the support member and a second joint portion disposed to another of the sliding member and the support member. The first joint portion includes a pair of support walls facing each other in a vehicle width direction and a fulcrum shaft disposed in a bridging manner between both of the support walls. The second joint portion is a component having an engagement portion for engagement with the fulcrum shaft and being arranged between both of the support walls while being relatively rotatable about the fulcrum shaft by being joined to the first joint portion, and on the second joint portion, a cushion member to be interposed between the second joint portion and the respective support walls while being fixed to the second joint portion is disposed.

The above-described configuration enables position adjustment of the movable panel, which is supported by the support member, to be performed with a simple configuration that uses gaps formed between the respective support walls of the first joint portion and the second joint portion. In addition, action of the cushion member, which is interposed between the second joint portion and the respective support walls, enables impact due to interference between the second joint portion and the respective support walls to be mitigated and occurrence of contact noise to be suppressed. In particular, fixing the cushion member to the second joint portion enables the cushion member to be stably interposed between the second joint portion, which relatively rotates about the fulcrum shaft, and the respective support walls of the first joint portion without increasing the size of the cushion member. As a consequence, this configuration enables high quality feeling to be secured.

In the above-described sunroof device, the cushion member may be an annular elastic member fitted on an outer periphery of the second joint portion including both side surfaces facing the respective support walls.

The above-described configuration enables the cushion member, which is interposed between the second joint portion and the respective support walls while being fixed to the second joint portion, to be formed in a simple configuration and in an easily mountable manner.

In the above-described sunroof device, the second joint portion may have an annular groove into which the annular elastic member is fitted.

The above-described configuration enables a fitting position of the annular elastic member on the second joint portion to be stably maintained with a simple configuration.

In the above-described sunroof device, the engagement portion may have an opening portion through which the fulcrum shaft can be engaged and disengaged in a radial direction of the fulcrum shaft, and the fulcrum shaft may have a cross-sectional shape restricting the engagement and disengagement of the fulcrum shaft through the opening portion in a relative rotation range between the first joint portion and the second joint portion defined based on opening and closing movements of the movable panel, and also allowing the engagement and disengagement of the fulcrum shaft through the opening portion at a rotation position out of the relative rotation range defined based on opening and closing movements of the movable panel.

The above-described configuration enables stable opening and closing movements of the movable panel involving relative rotation between the first joint portion and the second joint portion to be ensured and improvement in the ease of assembly to be achieved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sunroof device comprising:
   a movable panel disposed in a roof opening portion of a vehicle;
   a guide rail extending in a vehicle longitudinal direction;
   a sliding member sliding along an extending direction of the guide rail; and
   a support member supporting the movable panel and causing the movable panel to perform opening and closing movements by moving integrally with the sliding member while being joined to the sliding member, the sunroof device also comprising:
   a first joint portion disposed to one of the sliding member and the support member; and
   a second joint portion disposed to another of the sliding member and the support member, wherein
   the first joint portion includes
      a pair of support walls facing each other in a vehicle width direction, and
      a fulcrum shaft disposed in a bridging manner between both of the support walls,
   the second joint portion is
   a component having an engagement portion for engagement with the fulcrum shaft and being arranged between both of the support walls while being relatively rotatable about the fulcrum shaft by being joined to the first joint portion, and,
   on the second joint portion, a cushion member to be interposed between the second joint portion and the respective support walls while being fixed to the second joint portion is disposed.

2. The sunroof device according to claim 1, wherein the cushion member is an annular elastic member fitted on an outer periphery of the second joint portion including both side surfaces facing the respective support walls.

3. The sunroof device according to claim 2, wherein the second joint portion has an annular groove into which the annular elastic member is fitted.

4. The sunroof device according to claim 1, wherein
   the engagement portion has an opening portion through which the fulcrum shaft can be engaged and disengaged in a radial direction of the fulcrum shaft, and
   the fulcrum shaft has a cross-sectional shape restricting the engagement and disengagement through the opening portion in a relative rotation range between the first joint portion and the second joint portion defined based on opening and closing movements of the movable panel, and also allowing the engagement and disengagement through the opening portion at a rotation position out of the relative rotation range defined based on opening and closing movements of the movable panel.

5. The sunroof device according to claim 2, wherein
   the engagement portion has an opening portion through which the fulcrum shaft can be engaged and disengaged in a radial direction of the fulcrum shaft, and
      the fulcrum shaft has a cross-sectional shape restricting the engagement and disengagement through the opening portion in a relative rotation range between the first joint portion and the second joint portion defined based on opening and closing movements of the movable panel, and also allowing the engagement and disengagement through the opening portion at a rotation position out of the relative rotation range defined based on opening and closing movements of the movable panel.

6. The sunroof device according to claim 3, wherein
   the engagement portion has an opening portion through which the fulcrum shaft can be engaged and disengaged in a radial direction of the fulcrum shaft, and
   the fulcrum shaft has a cross-sectional shape restricting the engagement and disengagement through the opening portion in a relative rotation range between the first joint portion and the second joint portion defined based on opening and closing movements of the movable panel, and also allowing the engagement and disengagement through the opening portion at a rotation position out of the relative rotation range defined based on opening and closing movements of the movable panel.

* * * * *